June 26, 1945. E. BRINKMANN 2,379,215
APPARATUS AND METHOD FOR HANDLING VOLATILE LIQUIDS
Filed May 8, 1943
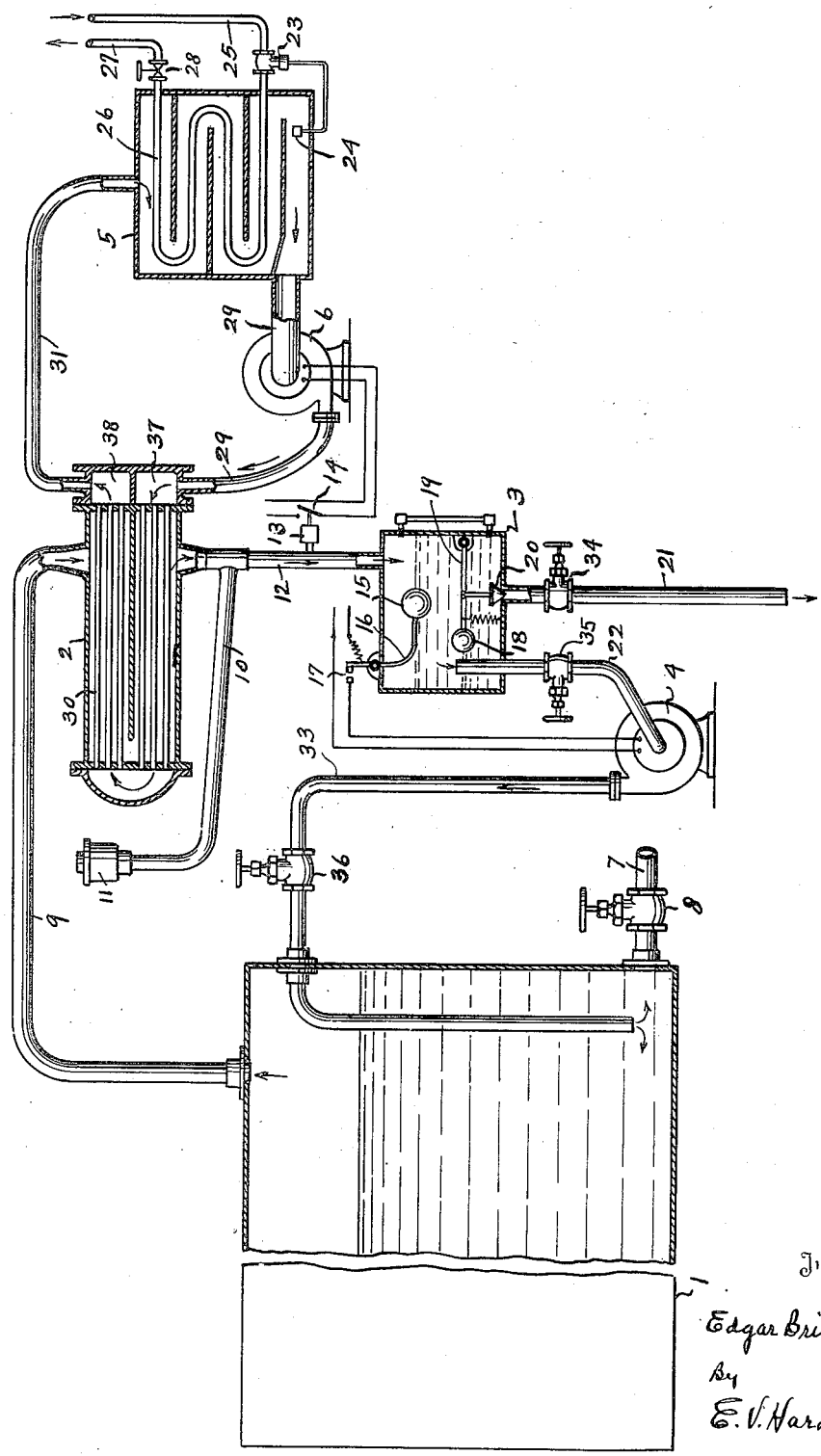

Patented June 26, 1945

2,379,215

UNITED STATES PATENT OFFICE 2,379,215

APPARATUS AND METHOD FOR HANDLING VOLATILE LIQUIDS

Edgar Brinkmann, Houston, Tex.

Application May 8, 1943, Serial No. 486,482

9 Claims. (Cl. 62—1)

This invention relates to an improved method of storing and transferring volatile liquids and it pertains more particularly to a method and apparatus for storing petroleum oils for transportation in water borne vessels and storing and transferring petroleum oils in land storage vessels. It also pertains to an improved method and apparatus of transferring petroleum oils from one storage vessel to another.

On water borne vessels used for storing and transporting volatile petroleum oils it is necessary to leave an empty space above the liquid and under the top of the storage tank to allow for the expansion and contraction of the liquid due to temperature changes of the liquid. This empty space becomes filled with the gases liberated from the liquid and there is an expansion and contraction, or a breathing, of this space caused by changes of temperature. This change of temperature is brought about by atmospheric changes and by the intermittent addition of heat from the sun's rays. Usually during the daylight the gases are heated and thereby expand causing a rise in pressure, then at night the gases are again cooled and contracted causing the pressure to drop below atmospheric pressure. Since the ordinary water borne vessels cannot practically be constructed to withstand abnormal pressures from within or without the vessels are provided with valves to release the pressure or relieve the vacuum at stages where the structure of the vessels will not be distorted or ruptured. This causes valuable gases to be released into the atmosphere when a rise in temperature creates a pressure within the tank, or vessel, and this also creates a hazard of explosions and fires in the vicinity of the relief valves on the vessels. This also causes air to be drawn into the vessel when there is a lowering of the temperature in the vessel. This air under normal conditions has a high relative humidity and when drawn into the vessel and is further cooled by the atmospheric condition, moisture settles itself on the metal surfaces creating a condition under which metal corrodes.

In land storage tanks, or vessels, the action is similar, causing losses of valuable gases, creating a hazard of explosions and fires, and causing the metal vessels to corrode internally. When transferring volatile petroleum liquids from one storage vessel to another the liquid in the receiving vessel is agitated and it volatilizes. The displacement of the gases and air in the receiving vessel by the liquid and additional gases liberated by this agitation forces gases out of the receiving vessel. In the vessel from which the liquid is taken a partial vacuum is created and air from the atmosphere is drawn in. The action in transferring the volatile liquid from one vessel to another is then similar to that when intermittent pressure and vaccum are created by atmospheric conditions.

An object of this invention is to provide a method and apparatus to minimize the losses of valuable volatile gases in storage vessels and in transporting vessels for volatile liquids and to minimize these losses in transferring volatile liquids from one storage vessel to another.

Another object of this invention is to provide a method and apparatus to practically eliminate the hazard of explosions and fires in storing, transporting and transferring inflammable volatile liquids.

Still another object of this invention is to provide a method and apparatus to prevent corrosion of the internal metal surfaces of vessels used for the storing and transportation of liquids, which in themselves are not corrosive.

Still another object of this invention is to provide a method and apparatus of this type which lends itself readily to automatic control.

These objects and other advantages are attained by apparatus and a method described in the accompanying drawing wherein:

The figure shows a side elevation of a form of the apparatus, shown partly in section.

Referring more particularly to the drawing, the numeral 1 designates a sealed storage vessel which may be of any size, built of any kind of material, in any shape or form. As it relates to my invention it is generally built of steel, is cylindrical in shape, with a flat bottom and tapered roof for land storage vessels but is made of steel and made in rectangular shape for water borne storage vessels.

Numeral 2 designates a sealed heat exchanger, generally made of all metal parts, in which the temperature of air and gases can be lowered by coming in contact with colder surfaces and the heat given up, thereby being carried away from these surfaces by a relatively cold liquid circulating over the surfaces on the opposite sides.

There is also a sealed vessel 3 into which condensed gases and water vapor can drain by gravity from heat exchanger 2 and in which the lighter and heavier liquids can separate themselves one from the other.

There is a power driven pump 4 with which the lighter liquids can be pumped from vessel 3 back to the storage vessel 1.

There is also a heat exchanger 5 generally made of metal parts. This heat exchanger is fitted with pipe coils into which a refrigerant is expanded which in turn lowers the temperature of the liquid within it as it is circulated through it by a power pump 6.

The application of the invention to the various conditions under which the apparatus functions and the details of construction will now be more specifically explained and described.

The storage vessel has an inlet pipe 7 controlled by the valve 8 and when a volatile liquid is transferred into it through said inlet pipe a pressure is created within the vessel by the volumetric displacement of liquid and the liberation of volatile gases from the liquid due to agitation of the liquid. A transfer pipe 9 leads from the top of vessel 1 into the top of the heat exchanger 2, and this pressure is transmitted through pipe 9, to the vapor side of the heat exchanger 2. Leading out from the bottom of the heat exchanger there is the pipe 10 whose free end is upturned and equipped with a valve 11.

The valve 11 is a commercial pressure-vacuum release valve which opens to the atmosphere when the pressure or vacuum in the apparatus reaches a point below the safe pressure or vacuum to which the vessel 1 and connecting parts can be subjected. The heat exchanger is connected into the vessel 3 by means of a down pipe 12 equipped with the valve 13. This valve is a commercial pressure and vacuum control valve which is set to close an electric switch 14, which in turn controls the operation of the pump.

The pressure, created as above stated, in the tank 1, is transmitted to the heat exchanger, the vessel 3 and to the valves 11 and 13. When the pressure in the vessel 1 reaches a point where the valve 11 will be opened to the atmosphere a flow of volatile gases and air will be set up from the vessel through the heat exchanger to the atmosphere but at the same time the valve 13 will be actuated to close the switch 14 to complete an electrical circuit through the motor of the pump 6 to operate the pump and circulate the cooling liquid from heat exchanger 5 through heat exchanger 2 and from there back to heat exchanger 5.

The temperature of the cooling liquid is maintained at a point where the volatile gases liberated from the liquid in vessel 1 are cooled in heat exchanger part 2 to condense them back to a liquid state. It is obvious that the temperature to which the air entrained with the volatile gases can be cooled with this apparatus is not sufficient to liquify the air but a great portion of the moisture in this air will condense into water. Then the mixture of water and condensed volatile gases will drop by gravity through pipe 12 into the sealed vessel, where due to their difference in gravity and insolubility they will separate into two layers of liquid as shown.

The air, which is not condensed will escape through pipe 10 and valve 11 into the atmosphere.

In the sealed vessel 3, are located two floats. The upper float 15 is designed to float in the lighter liquid and it is fastened to the lower end of a lever 16, pivoted to the vessel 3 and whose upper end forms one contact of an electric switch 17. The float controls this switch which, when closed, completes an electrical circuit through the motor of the power driven pump 4 to start the pump which pumps the lighter liquid from the sealed vessel 3 back to the storage vessel 1. As the level of the lighter liquid is lowered the float 15 will descend and cause the electric switch to open and the motor of the pump to stop the pump.

The lower float 18 is designed to float in the condensed water vapor but to sink in lighter liquid. This float is connected to an arm 19 pivoted to tank 3 and depending from which is a valve 20. This float 18 controls the opening and closing of the valve 20. Leading downwardly from the vessel 3 is a drain pipe 21 which the valve 20 opens and closes. When the level of the water in vessel 3 is still below the top of the suction pipe 22, hereinafter described, the float causes the valve 20 to open and the water can drain out of the container through pipe 21 until a lower level is reached at which point the float causes the valve 20 to again close.

The suction pipe leads from the vessel 3 to the pump 4 and the upper end of this pipe extends the required distance up into the vessel 3.

The temperature of the cooling liquid in heat exchanger 5 is maintained at a set point by a commercial thermostatically controlled expansion valve 23 of which part 24 is the thermostatic element. This valve is mounted on the inlet pipe 25 for the refrigerant and it regulates the amount of refrigerant gas admitted to the cooling coils 26 within the heat exchanger 5 and to which said inlet pipe is connected. An outlet pipe 27 leads out from the coil 26 and is equipped with a cut off valve 28. The coil 26 is surrounded by a cooling fluid which is pumped, by the pump 6, through the pipe 29 and through the flues 30 in the heat exchanger 2 and back to the exchanger 5 through the pipe 31. From the above description of the operation of the apparatus it is obvious that the losses of valuable volatile gases into the atmosphere is eliminated and that the hazard accompanying the liberation of volatile inflammable gases into the atmosphere is also eliminated.

When the storage vessel 1 is full or partially full of volatile liquid and all, or a part, of the liquid is withdrawn from the vessel through pipe 7 and valve 8, a partial vacuum is created within the storage vessel. This partial vacuum is imparted again to all of the parts as enumerated above causing valve 11 to open and admit air from the atmosphere to enter the space above the liquid in the storage vessel 1, entering through pipe 10 to the vapor side of the heat exchanger and thence through pipe 9 to the storage vessel 1. At the same time the automatic valve 13 will close the electric switch 14, to complete an electrical circuit to the motor of the pump 6 to cause this pump to circulate cooling liquid through heat exchanger 2. The air thus admitted through valve 11 will be cooled before entering the storage vessel 1 and due to this lowering of the temperature of the air a certain amount of moisture will be condensed out of the air before entering the tank. The temperature of the cooling liquid and the rate at which air is drawn through the heat exchanger will determine the temperature to which the air will be lowered. The regulation valve 23 and its component part 24 are regulated to maintain a desired temperature of air before entering the storage vessel 1 so that it will be lower than the temperature the air will be subjected to after entering the storage vessel 1. This will insure the elimination of further condensation of moisture out of the air after it is in the storage vessel. The moisture which is condensed out of the air in the heat exchanger 2 drops by gravity to the sealed vessel 3 from which it is drained in response to the action of the float 18 on the valve 20.

There is an inverted U-pipe 33 leading from the pump 4 and entering the vessel 1 near the top and terminating near the bottom of the vessel. This pipe conducts the liquified gases back to the storage vessel 1 from the vessel 3. The purpose of the free end being close to the bottom of the storage vessel 1 is so that the entrance of the liquified gases will cause no agitation of the surface of the liquid within the storage vessel and to cause these liquified gases to mix more thoroughly with the parent liquid.

The pipes 21, 22 and 33 are controlled by the respective gate valves, 34, 35 and 36 by which they may be opened or closed.

From the above description of the operation of the apparatus it is obvious that the air admitted to the storage vessel 1 is dry and that it eliminates the presence of moisture on the inside surface of the storage vessel thereby eliminating all corrosion of its metal parts which occurs only in the presence of water moisture. It is a well established fact that corrosion is an electro-chemical process and that it can occur only in the presence of an electrolyte. Water moisture is an electrolyte whereas petroleum oils are not.

When there is no transfer of the volatile liquid into or from the storage vessel 1 and this vessel is empty or partially so, but the vessel or its contents are subject to changes in temperature due to atmospheric conditions there is an intermittent pressure and vacuum created in it. The operation of the apparatus will react similarly to the condition when liquid is withdrawn or admitted to the storage vessel 1 and the advantages inherent in the apparatus are the same.

In some types of installation it may be found practical to eliminate the heat exchanger 5 and the parts associated therewith. In such case the pipe 25 could be connected directly into the lower, or inlet, chamber 37 of the heat exchanger 2 and the pipe 27 could be connected directly into the upper, or outlet, chamber of the heat exchanger 2. Also in this arrangement the element 24 would be located in the lower chamber 37.

The drawing and description are illustrative merely while the broad principle of the invention will be defined by the appended claims.

What I claim is:

1. The method of preventing corrosion on the inside surface of a metal tank for storing petroleum oils, which consists in sealing the tank against the inlet of air, leading air from the surrounding atmosphere into the tank, as the liquid is displaced from the tank, cooling the air as it is led into the tank to a temperature lower than the temperature on the inside of the tank.

2. The method of preventing corrosion on the inside surface of a metal storage tank for petroleum oils, which consists in introducing air into the tank as the liquid is displaced therefrom, cooling said air as it is introduced into the tank to a temperature lower than the temperature within the tank and extracting a portion of the water vapor from the air during the cooling process and before the air enters the tank.

3. A storage system for volatile petroleum oils comprising a normally closed and sealed storage tank composed of metal, a conduit leading from the outside air into the upper portion of the tank, a cooling device incorporated into said conduit, means for regulating the cooling device to cool the air entering the tank through the conduit to a lower degree of temperature than the temperature within the tank to prevent condensation of water vapor in the air on the walls of the tank.

4. A storage system for volatile petroleum oils comprising a closed metal storage tank, a conduit leading into the upper portion of the tank, a cooling device connected with the tank through said conduit, means for circulating a cooling agent through the cooling device, means provided for the inlet of air from the outside atmosphere through the cooling device and conduit into the tank, means for controlling the temperature of the cooling agent circulating through the cooling device so that the temperature of the air entering the tank will be lower than the temperature within the tank.

5. A storage system for volatile petroleum oils comprising a closed metal storage tank, a conduit leading into the upper portion of the tank, a cooling device connected with the tank through said conduit, means for circulating a cooling agent through the cooling device, means provided for the inlet of air from the outside atmosphere through the cooling device and conduit into the tank, means for controlling the temperature of the cooling agent circulating through the cooling device so that the temperature of the air entering the tank will be lower than the temperature within the tank and means for collecting moisture condensed from the air during its passage through the cooling device.

6. A storage system for volatile petroleum oils comprising a closed metal storage tank, a conduit leading into the upper portion of the tank, a cooling device connected with the tank through said conduit, means for circulating a cooling agent through the cooling device, means provided for the inlet of air from the outside atmosphere through the cooling device and conduit into the tank, means for automatically regulating the temperature of the cooling agent circulating through the cooling device to maintain the temperature of the air entering the tank lower than the temperature within the tank to prevent condensation of moisture on the inside walls of the tank.

7. A storage system for volatile petroleum oils comprising a normally closed storage tank, a conduit leading out from the upper portion thereof, a cooling device connected with the tank through said conduit, means for circulating a cooling agent through the cooling device, means for egress or ingress of atmospheric air to control the pressure or vacuum in the storage tank, so as to cause all air entering the tank to pass through the cooling device, means for controlling the temperature of the cooling agent circulating through the cooling device and means for draining the moisture condensed from the air and petroleum gases to a drain tank in sealed communication with the cooling device.

8. The method of preventing corrosion on the inside surface of a metal tank for storing petroleum oils, which consists in sealing the tank against the inlet of air, leading air from the surrounding atmosphere into the tank as the liquid is displaced from the tank, cooling the air as it is led into the tank to the lowest anticipated temperature within the tank.

9. The method of preventing corrosion on the inside surface of a metal tank for storing petroleum oils, which consists in sealing the tank against the inlet of air, leading air from the surrounding atmosphere into the tank, as the liquid is displaced from the tank, extracting sufficient moisture from the air as it is led into the tank to prevent condensation of water vapors from the air at the lowest anticipated temperature in the tank.

EDGAR BRINKMANN.